United States Patent
Hayner et al.

(10) Patent No.: US 8,578,775 B2
(45) Date of Patent: Nov. 12, 2013

(54) GENERATION, INJECTION AND USE OF PILOT TONES FOR GYRO SYSTEM CHARACTERIZATION

(75) Inventors: David A. Hayner, Austin, TX (US); Dejan Mijuskovic, Chandler, AZ (US)

(73) Assignee: Freescale Semiconductor, Inc., Austin, TX (US)

( * ) Notice: Subject to any disclaimer, the term of this patent is extended or adjusted under 35 U.S.C. 154(b) by 913 days.

(21) Appl. No.: 12/701,780

(22) Filed: Feb. 8, 2010

(65) Prior Publication Data
US 2011/0192226 A1 Aug. 11, 2011

(51) Int. Cl.
*G01C 19/00* (2013.01)
(52) U.S. Cl.
USPC .................. 73/504.12; 329/360; 702/104
(58) Field of Classification Search
USPC ............... 73/504.12, 504.04, 514.01, 514.02; 702/104; 329/360
See application file for complete search history.

(56) References Cited

U.S. PATENT DOCUMENTS

| 5,291,607 A * | 3/1994 | Ristic et al. | 713/300 |
| 5,493,248 A * | 2/1996 | Dunn et al. | 327/512 |
| 7,213,458 B2 | 5/2007 | Weber et al. | |
| 7,434,464 B2 | 10/2008 | Li | |
| 8,156,805 B2 * | 4/2012 | Hayner et al. | 73/504.12 |
| 2003/0123574 A1 * | 7/2003 | Simeon et al. | 375/340 |
| 2004/0257947 A1 | 12/2004 | Hayner | |
| 2007/0265791 A1 * | 11/2007 | Valadon | 702/76 |
| 2008/0246876 A1 | 10/2008 | Hayner | |
| 2010/0263445 A1 * | 10/2010 | Hayner et al. | 73/504.12 |

FOREIGN PATENT DOCUMENTS

EP 1657873 A1 * 5/2006

OTHER PUBLICATIONS

S. Park et al., Discrete Time Adaptive Control for a MEMS Gyroscope, Int'l Journal of Adaptive Control and Signal Processing, 2005; 00:1-6.
Hayner et al., U.S. Appl. No. 12/424,281, filed Apr. 15, 2009, entitled MEMS Inertial Sensor With Frequency Control and Method.

* cited by examiner

*Primary Examiner* — Peter MacChiarolo
*Assistant Examiner* — Samir M Shah
(74) *Attorney, Agent, or Firm* — Terrile, Cannatti, Chambers & Holland, LLP; Michael Rocco Cannatti (57) ABSTRACT

A microcontroller-based method and apparatus are described for generating one or more amplitude and frequency selectable low frequency pilot tone signals (PT) that are injected into an embedded MEMS sensor (110) and mixed signal ASIC (120) and then recovered at the microcontroller (140) to compute or measure various gyro parameters during operational use of the device with no down time or interference with normal operations.

20 Claims, 5 Drawing Sheets

GENERATION, INJECTION AND USE OF PILOT TONES FOR GYRO SYSTEM CHARACTERIZATION

BACKGROUND OF THE INVENTION

1. Field of the Invention

The present invention is directed in general to the field of Micro-Electro-Mechanical Systems (MEMS). In one aspect, the present invention relates to MEMS inertial sensor devices and methods for operating same.

2. Description of the Related Art

Micro-Electro-Mechanical Systems (MEMS) technology is increasingly used to integrate mechanical elements, sensors, actuators, and electronics onto very small mechanical structures using conventional batch semiconductor processing techniques. For example, inertial sensors may be formed with MEMS devices on an integrated circuit wafer substrate to form various applications, such as a MEMS gyroscope that is used to detect the angular velocity.

Conventional gyro sensors have performance limitations associated with various non-idealities in both the sensor design and in manufacturing imperfections inevitable in manufacturing. For example, sensor fabrication can involve one or more process steps (e.g., deposition, etching, patterning of materials, etc.) that can contribute to imperfections in the gyroscope that result in asymmetric structures, misalignment of actuation mechanism, non-idealities in the linking or coupling springs, and deviations of the center of mass from the geometric center. These imperfections and others can result in undesirable, systematic perturbations in the form of mechanical and electrostatic forces which degrade the performance of a gyroscope. In addition, there are run-time variations that can create imperfections in the gyroscope performance. While high order observers and adaptive controllers have been proposed for cancelling or compensating for imperfections or variations that affect the MEMS gyroscope performance, such solutions are computationally prohibitively expensive, analytically complex, and/or difficult to implement.

Accordingly, a need exists for an improved MEMS gyroscope apparatus, system and method of operations that addresses various problems in the art where various limitations and disadvantages of conventional solutions and technologies will become apparent to one of skill in the art after reviewing the remainder of the present application with reference to the drawings and detailed description which follow, though it should be understood that this description of the related art section is not intended to serve as an admission that the described subject matter is prior art.

BRIEF DESCRIPTION OF THE DRAWINGS

The present invention may be understood, and its numerous objects, features and advantages obtained, when the following detailed description is considered in conjunction with the following drawings, in which.

DETAILED DESCRIPTION

A MEMS gyro sensor and associated methodology of operation are described for dynamically measuring predetermined gyro parameters during operational use of the gyro sensor by using a microcontroller, dedicated hardware or other appropriate means to generate and inject one or more pilot test signals into the sense resonator of the gyro sensor. In this way, one or more pilot test signals may be injected into the quadrature channel as pilot tones that are amplitude and frequency selectable, thereby allowing the non-quadrature or in-phase signals to carry rate channel data. In selected embodiments, the pilot test signal injection can be done after using feedback control techniques to correct for quadrature errors, thereby reducing the amplitude of potential interfering signals in the quadrature channel. In other embodiments, the pilot test signal(s) may be adjusted to dynamically extract key system parameters (such as the plant Q, plant gain, gain offsets, bias terms, coupling coefficients, delays, correlations, etc.) and to continuously monitor the operation of the gyro sensor by recovering and processing the pilot test signal(s) from the quadrature channel and to extract various system parameters for the gyro sensor, all without requiring down time or interference with normal operations. In selected embodiments, a MEMS gyro sensor system is implemented as a gyro transducer element, an analog/digital application specific integrated circuit (ASIC) and a micro-controller unit (MCU) which are assembled together in a common package. In single package architecture, the gyro transducer contains the physical mechanical devices which together sense angular velocity, the ASIC serves as an analog/digital interface (e.g., converts changes in capacitance to voltages, performs analog signal conditioning, provide A/D and D/A conversion, and provides an analog gain control loop and frequency sourcing, modulation and demodulation, possibly servos, and a variety of other signal processing functions), and the MCU potentially closes the loop on several devices in the transducer (e.g., controls the center frequency of the sense resonator) and, or updates various analog functions on the ASIC. In addition, the MCU generates one or more pilot tone signals which are applied through the ASIC and injected into the gyro transducer using the quadrature channel (e.g., through various drive electrodes). The MCU then retrieves or extracts the pilot tone signals from the transducer output after processing by the ASIC, such as by performing a Goertzel or other frequency selective algorithm on the received baseband signals, measuring the error signal, and processing the output to extract one or more gyro parameters. These gyro parameters can be used to update various control functions, monitor health and performance of the device and provide detailed information regarding operational characteristics of the gyro.

Various illustrative embodiments of the present invention will now be described in detail with reference to the accompanying figures which illustrate functional and/or logical block or module components and various processing steps. It should be appreciated that such block or module components may be realized by any number of analog and/or digital hardware and/or software components configured to perform the specified functions. For the sake of brevity, conventional techniques related to semiconductor processing, MEMS processing, and sensor technology are not described herein. While various details are set forth in the following description, it will be appreciated that the present invention may be practiced without these specific details, and that numerous implementation-specific decisions may be made to the invention described herein to achieve the device designer's specific goals, such as compliance with process technology or design-related constraints, which will vary from one implementation to another. While such a development effort might be complex and time-consuming, it would nevertheless be a routine undertaking for those of ordinary skill in the art having the benefit of this disclosure. For example, selected embodiments of the present invention are implemented, for the most part, with electronic components and circuits known to those skilled in the art, and as a result, circuit details have not been explained in any greater extent since such details are well known and not considered necessary to teach one skilled in the art of how to make or use the present invention. In addition, selected aspects are depicted with reference to simplified signal model, hardware flow chart drawings without including every circuit detail or feature in order to avoid limiting or obscuring the present invention. Such descriptions and representations are used by those skilled in the art to describe and convey the substance of their work to others skilled in the art.

Figure 1:
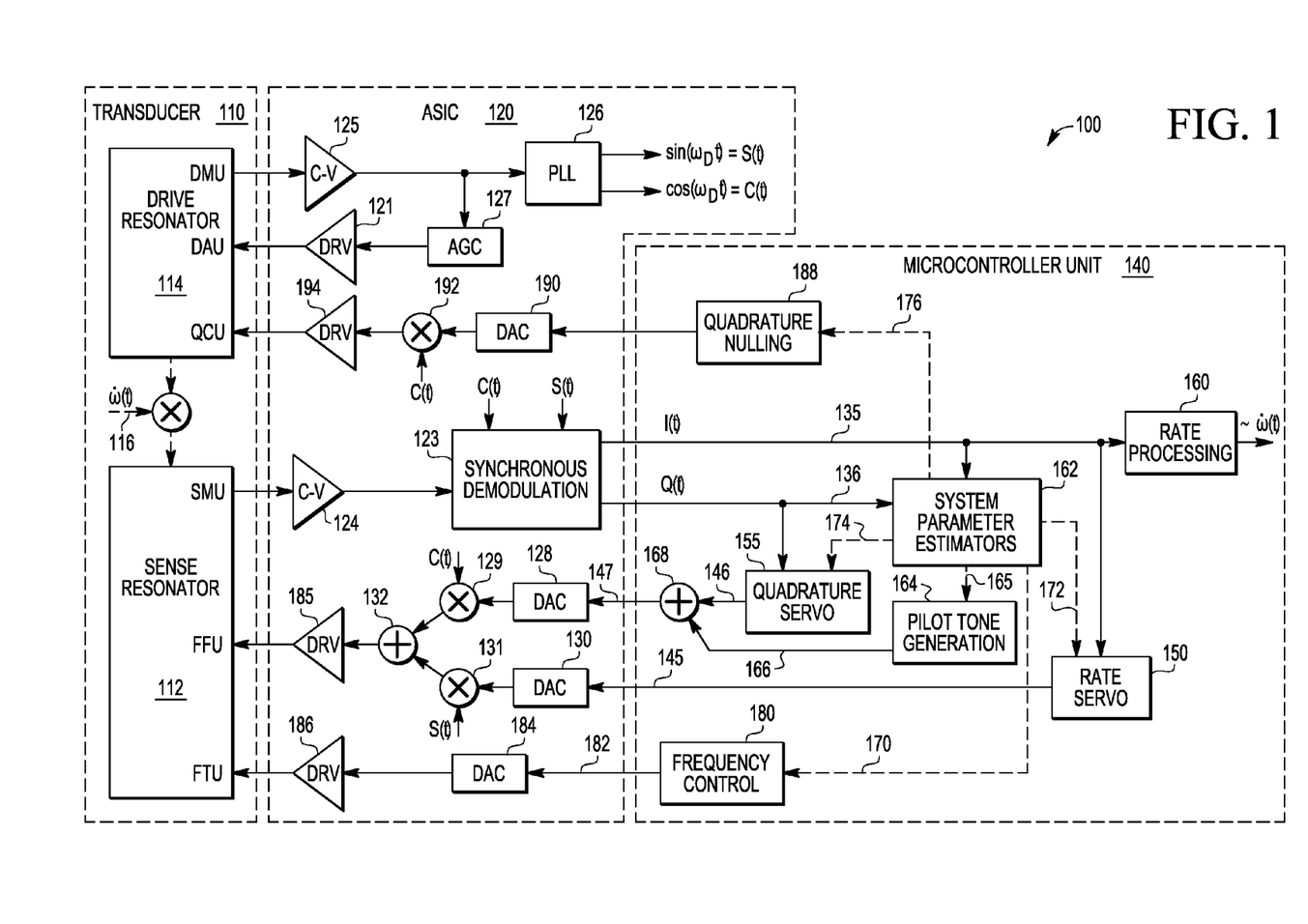
FIG. 1 is a block diagram view of a MEMS inertial sensor system with pilot tone generation, insertion, and recovery for characterizing predetermined gyroscope system parameters during operation of the gyroscope.

FIG. 1 is a block diagram view of a MEMS inertial sensor system 100 with pilot tone generation and insertion. As depicted, the MEMS inertial sensor system 100 includes a transducer section 110, an application specific integrated circuit (ASIC) section 120 and a micro-controller unit (MCU) section 140. The transducer section 110 includes a driver resonator 114 and a sense resonator 112 having a design that is selected according to the requirements of a given MEMS inertial sensor application. Generally speaking, the sense resonator 112 functions as a transducer that converts angular rate movement 116 to capacitance change signals that are output to the capacitance-to-voltage amplifiers 124 in the ASIC section 120. The ASIC section 120 also includes a synchronous demodulator 123, an automatic gain control (AGC) loop 127 for driving and controlling the drive voltage signal applied to oscillate the drive mass(es), a phase locked loop (PLL) 126 for generating clock signals, a first modulator 129, a second modulator 131, and a summer 132. The ASIC section 120 also includes other signal conditioning circuitry, such as the capacitance-to-voltage (C-V) amplifiers 124, 125, analog-to-digital converters (ADC) in the synchronous demodulator unit 123, digital-to-analog converters 128, 130, 184, 190 and driver circuits 121, 194, 185 and 186. The MCU section 140 includes a frequency control system 180, a system parameter estimation circuit/module 162, quadrature servo circuit/module 155, rate servo circuit/module 150, quadrature nulling circuit/module 188, pilot tone generator circuit/module 164, and rate processing circuit/module block 160.

In operation, the drive resonator 114 is maintained in a constant amplitude oscillation by the AGC loop 127 which provides feedback to the Drive Actuator Unit (DAU) which has the drive electrodes used in the drive resonator 114 to apply a driving (force) signal to the drive mass in a predetermined drive direction (e.g., in the y-direction). The physical construction of the drive resonator 114 ensures that it will oscillate at a fixed carrier frequency, $w_D$. This constant amplitude and frequency signal is modulated by the input angular rate signal 116. The angular rate signal 116 modulated on the carrier frequency $w_D$ induces a change in capacitance that is measured by the Sense Measurement Unit (SMU) in the sense resonator 112 which are used to measure the position of the sense mass in a predetermined sense direction (e.g., in the z-axis). This change in capacitance is converted to a voltage by the C-V amplifier 124. Synchronous demodulation of this carrier by signals $\cos(w_D t)$ and $\sin(w_D t)$ by the synchronous demodulation block 123 results in the quadrature baseband signals I(t) 135 and Q(t) 136. The demodulation timing signals s(t) and c(t) are generated by PLL 126 which is connected to the driver resonator C-V amplifier 125. In turn, the C-V amplifier 125 receives and amplifies the Drive Measurement Unit (DMU) signals from the drive resonator 114 which provide a capacitive measure of the position of the drive mass in a predetermined direction. As a result, the demodulation timing signals s(t) and c(t) are synchronous with the drive resonator oscillations.

Depending on the frequency offset between the driver resonator 114 and sense resonator 112, the demodulated rate signal will be substantially on either the I(t) or Q(t) signals. Without loss of generality, the rate signal may be assumed to be present on the I(t) 135 signal. The rate signal is fed to rate servo unit 150 which is used to generate a rate feedback signal 145. This rate feedback signal 145 is converted to an analog signal by digital to analog convertor (DAC) 130, modulated onto the $w_D$ carrier by modulator 131 and fed back to the sense resonator 112 via drive amplifier 185 in order to realize a specific transfer function from the input angular rate signal 116 to the rate signal represented by I(t) 135. At the sense resonator 112, the processed rate feedback signal is provided via driver 185 to the Force Feedback Unit (FFU) which includes electrodes for driving the sense mass in the predetermined direction (e.g., the z direction), thereby "closing the loop" on the rate signal. Rate processing unit 160 may be present in order to further process the recovered estimate to the input angular rate signal 116. This processing may suppress various errors, filter noise or corrupting signals, or a variety of other functions.

In a similar manner, the quadrature signal, Q(t) 136 representing various systematic errors is also generated by the synchronous demodulation block 123. The quadrature signal 136 is directed to the quadrature servo unit 155 which generates a feedback signal 146. This quadrature feedback signal 146 is used to correct for various systematic errors present in the gyro system. The quadrature feedback signal 146 is converted to an analog signal in digital to analog convertor (DAC) 128, modulated onto the carrier $w_D$ by modulator 129 and summed with the digital to analog converted and modulated rate feedback signal 145 prior to driving the sense resonator via driver 185.

In practice, manufacturing imperfections, device-to-device variations and external disturbances can degrade the quality of the measured angular rate signal. While conventional approaches have used statistical estimation techniques to extract data relevant to these disturbances and permutations, these techniques are quite expensive in terms of computation requirements and, as a consequence, power consumption, cost and related economic measures. To simplify the computational design, operation and complexity of the system parameter estimator block 162 which functions to extract such disturbance data and estimate various system parameters, selected embodiments of the present invention use pilot tones to reduce the computation burden required in system parameter estimator block 162. To this end, the pilot tone block 164 generates a series of predetermined pilot tone signals 166 which are injected into the system in quadrature to the rate signal. These pilot tone signals 166 are summed with the quadrature feedback signal 146 at summer 168, converted to an analog signal by DAC 128, modulated into the quadrature channel by modulator 129, and driven to the sense resonator by driver 185. Using the pilot tone generator 164, the pilot tone signals 166 may be designed to simplify the extraction of specific system parameters. Examples of system parameters include, but are not limited to, drive resonator to sense resonator offset frequency or a sense resonator Q factor.

By injecting predetermined pilot tone signals 166 with known signal structure(s), the system parameter estimator 162 can extract key system parameters at much lower computational cost. These recovered parameters may be used to alter or tune the operation of various other processing blocks in the sensor system 100. For instance, drive to sense offset frequency information may be utilized to ensure that the sense resonator 112 center frequency is a fixed frequency offset from the driver resonator 114 center frequency. This may be accomplished by generating a frequency control signal 170 by the system parameter estimator 162 which is input to a frequency control block 180. The output of the frequency control block 180 is converted to an analog signal by the DAC 184 and driven via driver 186 to the appropriate electrodes at the Frequency Tuning Unit (FTU) of the sense resonator 112 that are used to provide alter the resonant frequency of the sense resonator 112. In a similar manner, a measure of the quadrature offset may be generated by the system parameter estimator 162 and supplied on signal line 176 which drives the quadrature nulling unit 188. The output of quadrature nulling unit 188 is converted to an analog signal by DAC 190 prior to modulation onto the carrier $w_D$ at modulator 192, and driven by drive amplifier 194 into the appropriate drive resonator 114 electrodes at the Quadrature Control Unit (QCU) which are positioned under the drive mass to help cancel unwanted motion of the drive mass in a predetermined direction (e.g., the z direction). Other outputs of system parameter estimation block 162 may control parameters in the quadrature servo 155 or rate servo 150. The ability of the system parameter estimation block 162 to modify the specific pilot tone signal 166 that are generated by the generator 164 is indicated by signal 165.

Figure 2:
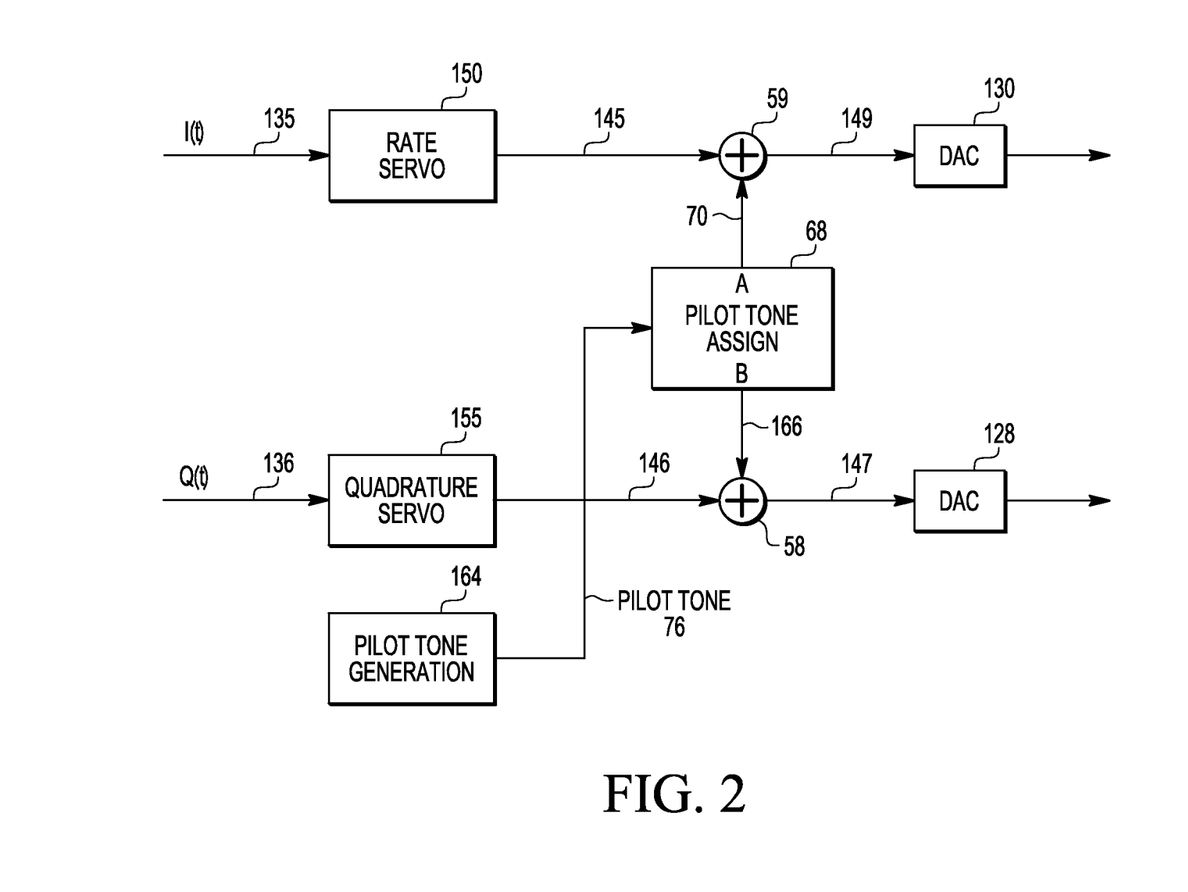
FIG. 2 is a simplified block diagram view showing the use of pilot tone signals as initially illustrated in FIG. 1.

Shown in FIG. 2 is a block diagram view showing the use of pilot tone signals as initially illustrated in FIG. 1. Pilot tone assign block 68 allocates some fraction of the pilot tone(s) 76, generated by pilot tone generator 164, to either the rate servo output signal 145 and/or the quadrature servo output signal 146. At the adders 58, 59, the allocated pilot tone signals 166 and 70 are added to servo signals 146 and 145 to generate output signals 147, 149, respectively.

These new outputs 147, 149 are drivers to the DACs 128 and 130 to convert these to analog signals in order to be modulated and drive the sense resonator 112. In this manner, appropriate levels of signal excitation can be delivered to both the InPhase and Quadrature signaling components as required in the specific application or implementation mode. As will be appreciated, the pilot tone generator may be configured to generate samples of a predetermined frequency or frequencies in accordance with a specific algorithm designed for generating this signal. In this described example, this may be a sine wave of a predefined amplitude and frequency, but other variations such as a combination of sine waves of various amplitudes, frequencies, and phase shifts may be used. This pilot tone may be generated by a series of microprocessor instructions or dedicated digital hardware or some combination of the two. If both A and B outputs are used, they may have different strengths, such as 70 percent on one channel and 30 percent on the other. The pilot tone assign block outputs the pilot tone on output A, for example, to provide feedback to the transducer sense resonator, while the second tone on output B is summed in summer block 58 and used, for instance, to convey one or more pilot test signals at predetermined frequencies for insertion into the quadrature channel of the transducer. In one embodiment, the pilot tone output on A is on the order of 500 Hz and the pilot tone output on B is on the order of 550 Hz. Additionally, these pilot tones may be modulated in various ways, amplitude, phase and/or frequency, to aid in recovery of predetermined gyroscope system parameter information.

Figure 3:
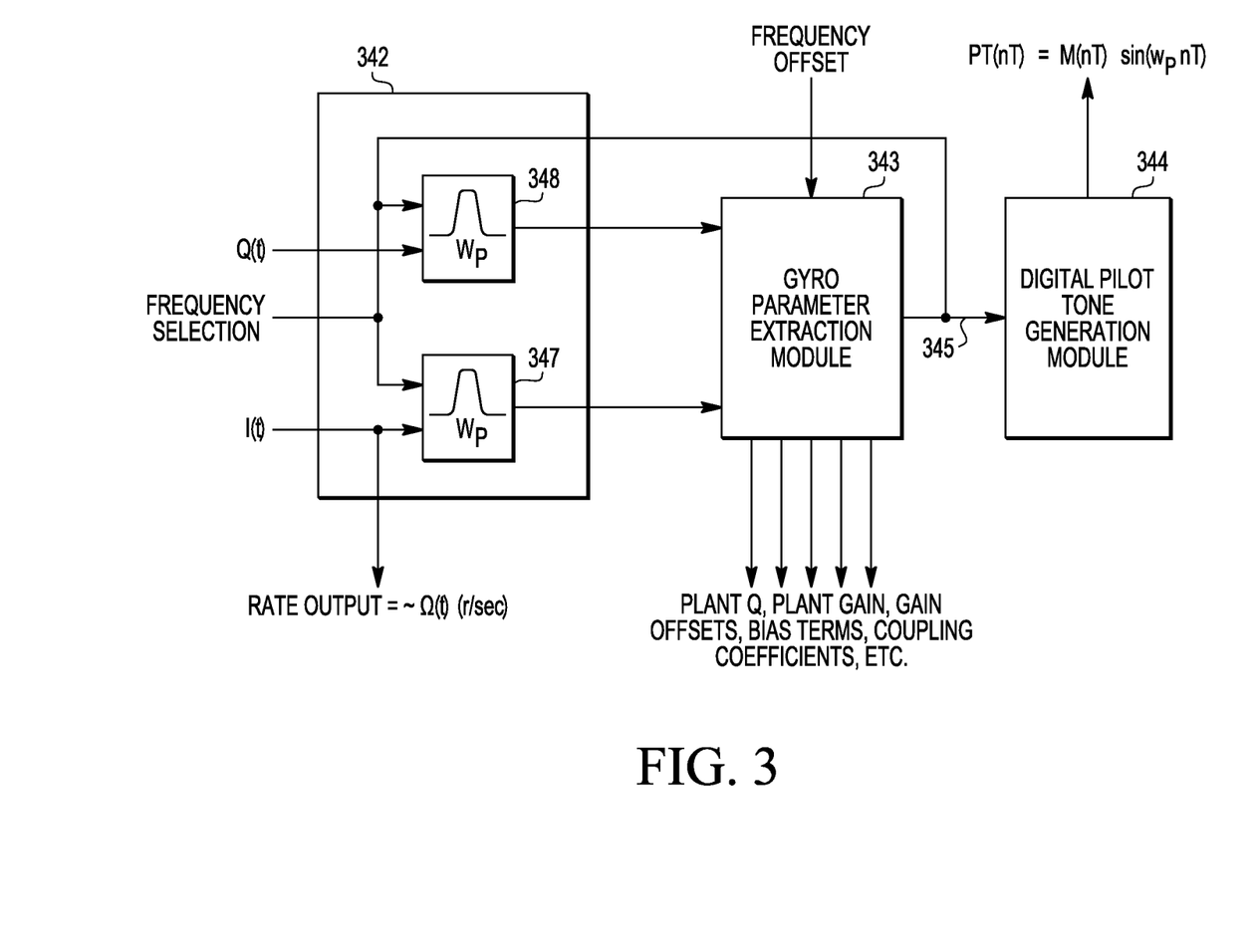
FIG. 3 is a simplified block diagram of the MCU control circuitry for generating and extracting predetermined pilot test tone signals from the transducer section.

Shown in FIG. 3 is a simplified block diagram the MCU control circuitry for generating and extracting predetermined pilot test tone signals from the transducer section 110. As depicted, the digital pilot tone generation module 344 corresponds in function to the pilot tone generation module 164 shown in FIGS. 1 and 2, and generates one or more pilot test tone signals (e.g., $PT(nT)=M(nT) \sin(\omega_P nT)$), each having a known amplitude (M) and frequency ($\omega_P$). As will be appreciated, the pilot test tone signals may be modulated in various ways, including but not limited to amplitude, phase and/or frequency modulation. The digital pilot tone generation module 344 has an output coupled through pilot tone assign block 68 in FIG. 2. In this way, the pilot test tone signal(s) may be injected into the quadrature or rate channels of the transducer section 110, such as by applying the modulated pilot test tone signals to the force feedback electrodes in the transducer (not shown) which control the movement and oscillation of the transducer sense mass.

To extract the pilot test tone signals from the sense resonator 112, the test signal extraction module 342 is provided which includes transfer function blocks 347, 348 which may function as filters to extract predetermined pilot test tone signal information. For example, the filters 347, 348 may implement a frequency specific filter functionality (such as a Goertzel algorithm) to extract the frequency content at a specified and controllable frequency (e.g., the known pilot test tone frequency), and to block all other frequencies. As illustrated, a first Goertzel filter block 347 has an input (for receiving output signal I) and an output (for outputting the filtered output signal I). Likewise, the second Goertzel filter block 348 has an input (for receiving output signal Q) and an output (for outputting the filtered output signal Q). Each of the Goertzel filter blocks 347, 348 passes predetermined frequency content to the gyro parameter extraction module 343. Other methods for extracting the pilot tone can also be used such as bandpass filters and similar devices. The predetermined frequency content from the test signal extraction module 342 is processed by the gyro parameter extraction module 343 to extract one or more gyro performance parameters. The gyro parameter extraction module 343 can also be configured to dynamically adjust the frequencies at which block 348 and 347 extract the pilot tones via Frequency Selection signal 345. This feature allows the system to tune specific pilot tones to best leverage this technique. At the gyro parameter extraction module 343, various software programs executed at the MCU are responsible for computing performance parameters. For example, the extraction module 343 can measure variations in the amplitude of the extracted pilot test signal tone, and then calibrate the measured amplitude variations to measure Q the sense resonator. The measurement of Q can be used to adjust various control algorithms which maintain optimal operation of the gyro. In addition, the extraction module 343 can measure the ratios or phase relationships between two or more pilot test signal tones, and then use these measurements to extract various bias, offset and coupling terms. Examples of system parameters that can be extracted, measured and compared include, but are not limited to, the plant gain, sense resonator ($Q_S$), and the center frequency of the sense resonator ($\omega_S$). With this approach, gyro parameters are efficiently extracted with significantly reduced computational complexity (by several orders of magnitude).

Figure 4:
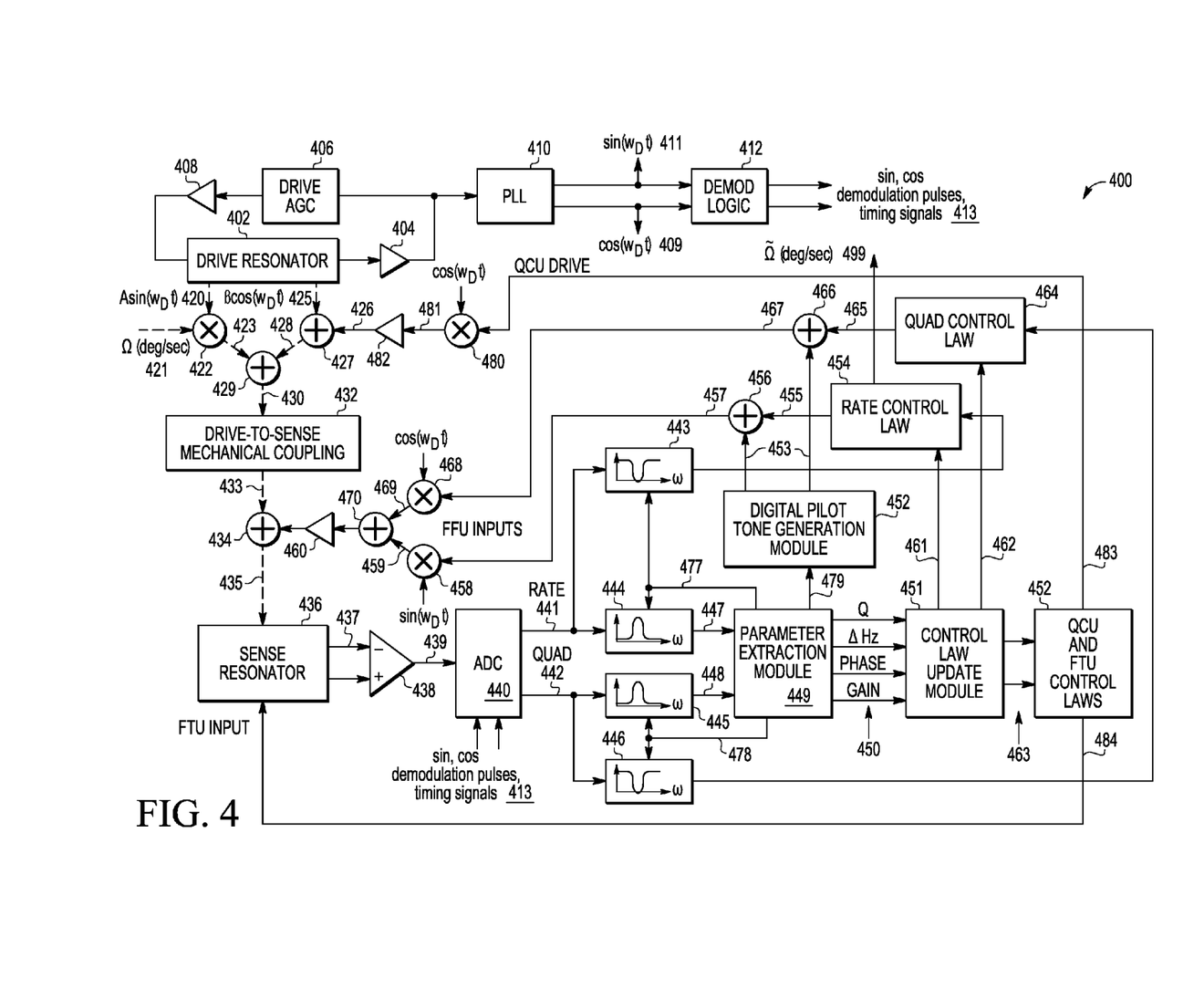
FIG. 4 is a signal model depiction of a MEMS-type vibratory gyroscope having a pilot tone feedback system for characterizing predetermined gyroscope system parameters during operation of the gyroscope.

Referring now to FIG. 4, there is depicted a signal model of a MEMS-type vibratory gyro system 400 having a pilot tone feedback system for characterizing predetermined gyroscope system parameters during operation of the gyroscope. As depicted, the gyro system 400 includes a transducer section (including drive resonator 402, drive-to-sense mechanical coupling 432, sense resonator 436, adders and modulators, 434, 458, 468, 480) and a digital control section (including pilot generation module 452, parameter extraction module 449, filters 443-446, rate and quad control law modules 454, 464, etc.) with various analog-digital interface circuits as required. In the figure, the depicted adder and multiplier 429 and 422 do not physically exist, but are included to represent the physical process of generating a vector force resulting from the cross-product of the vector velocity of the drive mass element and input angular velocity vector. This mechanical force represents the measure of input angular velocity, and is combined in the device structure with the electrically generated force at 429. For purposes of clarification, electrical signals are generally denoted with solid lines, and physical forces are denoted with dashed lines. In the transducer section, drive resonator 402 is maintained in continuous oscillation (e.g., approximately 12,000 Hz) by the drive analog gain control (AGC) block 406 and the C-V amplifier 404 and driver 408. The drive AGC block 406 maintains a constant amplitude of the drive oscillation frequency. The mechanical drive oscillation is represented by the velocity signal A sin $(w_D t)$ 420 and position signal B $\cos(w_D t)$ 425. An output of the C-V amplifier 404 is input to the phase lock loop (PLL) device 410 which is responsible for reconstructing electrical versions of the $\sin(w_D t)$ 411 and $\cos(w_D t)$ 409 of the mechanical velocity and position of the drive mass. These reconstructed signals 409, 411 are also used by demodulation and timing logic block 412 for generating demodulation and timing signals 413.

The transducer section consisting of drive-to-sense block 432 and sense resonator 436 measures the input angular rate using the equation V×Ω, where the oscillating drive velocity signal $V_y(t) = \sin(\omega_D t)$ 420 from the drive resonator 402 is modulated by the input angular rate signal Ω(t) 421. Assuming, for example, that the V (velocity) signal 420 is purely in the y direction, and that the input angular rate Ω(t) 421 is around the x axis, the resulting acceleration (force) would ideally be in the z direction. However, due to imperfections in the mechanics of the device (e.g., support springs are not all identical, mass is not perfectly uniform, the force driving electrodes are not perfectly symmetric, etc.), some fraction of the force driving the drive mass will cause the drive mass to oscillate in both the y and z directions. These corrupting signals, primarily in the z direction are represented by mechanical signal 425. To correct or minimize the magnitude of the corrupting signal 425, a correction signal 481 can be introduced through the driver 482 and associate electrodes (not shown) and combined with the corrupting signal 425 at the fictitious adder 427. The residual corrupting signal 428 from the adder 427 will be part of the overall mechanical motion 430 input to the drive-to-sense mechanical coupling block 432.

The drive-to-sense mechanical coupling block 432 transfers the acceleration (force) signal 430—representing both a measure of the input angular rate signal 423 and corrupting signals 428—to the sense resonator 436 which is also operating at approximately the same mechanical oscillation frequency as the driver resonator 402 (e.g., approximately 12,000 Hz). However and as explained hereinbelow, the rate and corruption acceleration signals 423, 428 transmitted to the sense resonator 436 can be modified by application of control signals 459, 469 applied to force driving electrodes (not shown).

At the output of the sense resonator 436, the sensed signal 437 is generated based on the relative position of capacitive plates and the change in capacitance as a function of position of these plates. The C-V amplifier 438 converts these capacitive changes to an electrical signal 439 which is demodulated via synchronous sampling at the analog-to-digital converter (ADC) 440. Timing signals 413 for this sampling are derived from the PLL 410 and demod logic 412. Since position is in the same phase as acceleration (because two time integrations are required to move from acceleration to position), the input angular rate data 421 modulated on the sin(wdt) carrier 420 can be recovered on the $\sin(w_D t)$ phase 441. Similarly, the corruption signals 428 are recovered on the $\cos(w_D t)$ phase 442. These signals are referred to as rate signal 441 and quad signal 442. As will be appreciated by those skilled in the art, various characteristics of the drive-to-sense coupling device 432 and sense resonator 436 can create some leakage of rate signals into the quad signal, and can also create leakage of quad signals into the rate signal. This leakage does not substantially impact the major characteristics or performance of the gyroscope device described herein, and for present purposes, these leakage signals can generally be ignored.

With existing sensor systems, the rate signal 441 and quad signal 442 are processed directly by rate control law block 454 and quad control law block 464, respectively, thereby generating rate control feedback signals 455 and quad control feedback signals 465. The rate and quad control feedback signals 455, 465 may be used to modify the overall characteristics of the transfer function from the input angular rate signal 421 to the gyro output 499. As depicted, the rate feedback signal 455 is modulated by the $\sin(w_D t)$ signal at modulator 458 to generate modulated rate signal 459, and the quad feedback signal 465 is modulated by the $\cos(w_D t)$ signal at modulator 468 to generate modulated quad signal 469. These modulated signals 459, 469 are added in summer 470 and converted to force by driver 460, and associated electrodes (not shown) to affect the overall characteristics of this sensing system by providing feedback to correct and adjust system performance.

In this feedback context, one or more pilot tones may be injected for use in continuously measuring various characteristics of the system during normal operations without impacting or degrading the performance of the system. For example, FIG. 4 shows a digital pilot tone generation module 452 which generates one or more frequencies or pilot tones 453 that are added to the rate feedback signal 455 and/or the quad feedback signal 465 via adders 456 and 466, respectively. In selected embodiments, the pilot tone(s) 453 generated by the pilot tone module 452 will be out of band relative to the expected bandwidth of the rate signal. For instance, the gyro bandwidth in many typical applications is on the order of DC to approximately 40-100 Hz. The pilot tone(s) 453 can be placed above this range and still be useful to the overall system. Additionally, the pilot tone(s) 453 can be injected in quadrature to the rate signal, in which case the pilot tone is only added into the quad feedback signal 465 via adder 466.

When a pilot tone 453 has been injected into the quad feedback signal 467, this signal will also be present in the quad signal 442. Due to leakage effects, some of the pilot tone 453 may also be in the rate signal 441. Bandpass filters 444, 445 are provided for receiving the rate and quad signals 441, 442, and are tuned to the same frequency as the injected pilot tone 453 to generate measures of the pilot tone on lines 447, 448, respectively. A parameter extraction module 449 may be provided to analyze these signals 447, 448 and to recover estimates of various system parameters 450 (e.g., Q, ΔHz, gain, phase, etc.). These system parameter signals 450 are provided as examples, and are not inclusive of all possible system parameter measures. The parameter extraction module 449 may also cause the frequency, amplitude or phase of the pilot tone 453 to change via connection 479 in order to facilitate certain system parameter measures. In concert with these frequency changes, the parameter extraction module 449 can also command the frequency selective filters 443-446 to change sense frequency via connections 477, 478 in order that these filters best extract or reject as appropriate the injected pilot tone 453.

The parameter extraction module 449 can also command the digital pilot tone generation module 452 to simultaneously create multiple test tones 453 and inject these into either the rate feedback signal 457 and/or the quad feedback signal 467. And while not explicitly illustrated, the parameter extraction module 449 can also command multiple parallel bandpass filters 444, 445 to operate so as to extract the multiplicity of pilot tones 453.

Based on the extracted parameters 450, the system may choose to update or modify the rate control law module 454 and the quad control law module 464 via control law update module 451 and connections 461, 462. Those skilled in the art will appreciate that a variety of control schemes are available for this adaptation. The control law update module 451 can also generate control signals 463 which control the characteristics of the QCU control loop realized with QCU & FTU control law block 452 and the feedback signal 483. In addition, signals 463 generated by the control law update module 451 can also impact the characteristics of the FTU control loop realized with QCU & FTU control law block 452 and the feedback signal 484.

In selected embodiments, bandstop filters 443, 446 can also be used to further reduce the amplitude of any pilot tones that either leak into the other channel or are purposely injected for various test reasons. As in the case of the bandpass filters 444, 445, these filters 443, 446 can be commanded via the parameter extraction module 449 and connections 477, 478 to track the frequency or frequencies generated by the digital pilot tone generation module 452.

With selected embodiments of the present invention, the extracted gyro parameter information may be processed by the MCU to calibrate and tune the gyro device during normal device operation, whether during manufacturing or in the field. This may be accomplished by reducing the quadrature error from the sense mass resonator output with a quadrature error correction feedback signal, using the "free" quadrature feedback channel to inject low frequency pilot test tones, recovering the pilot test tones from the baseband output signals I and Q, and then processing the recovered pilot test tones to dynamically measure the performance parameters of the gyro in real-time while the device is operating without corrupting the collected data or suspending or interrupting operation of the device. In other words, by placing low frequency pilot test tones in quadrature to the collected angular rate data, the pilot test tone recovery and the angular rate data collection can be performed in parallel without disturbing the normal operation of the device. These same techniques may be used to dynamically determine and control or adjust the performance of the gyro device, as well as allowing detection of current or future failures without disabling the device's sensing functions. The flexibility provided by using the MCU to generate, extract and process the pilot tones greatly simplifies the design of the analog and digital electronics, as compared to the much larger die area requirements for an analog ASIC implementation for generating accurate, low frequency (100-1000 Hz) signals and frequency selective filters sensitive at these frequencies. It will also be appreciated that the ability to dynamically tune analog ASIC circuits is quite restricted and/or expensive, as compared to a digital, MCU-based implementation. In addition, the use of the MCU to generate, extract and process the pilot tones provides a very flexible environment, e.g., writing software, facilitating the development of modifications, incorporation of new ideas or methods into the processing. Finally, the computations required to extract key performance characteristics of the gyro can be significantly simplified by using pilot test tones since the MCU can be programmed to extract these predetermined pilot test tones.

Figure 5:
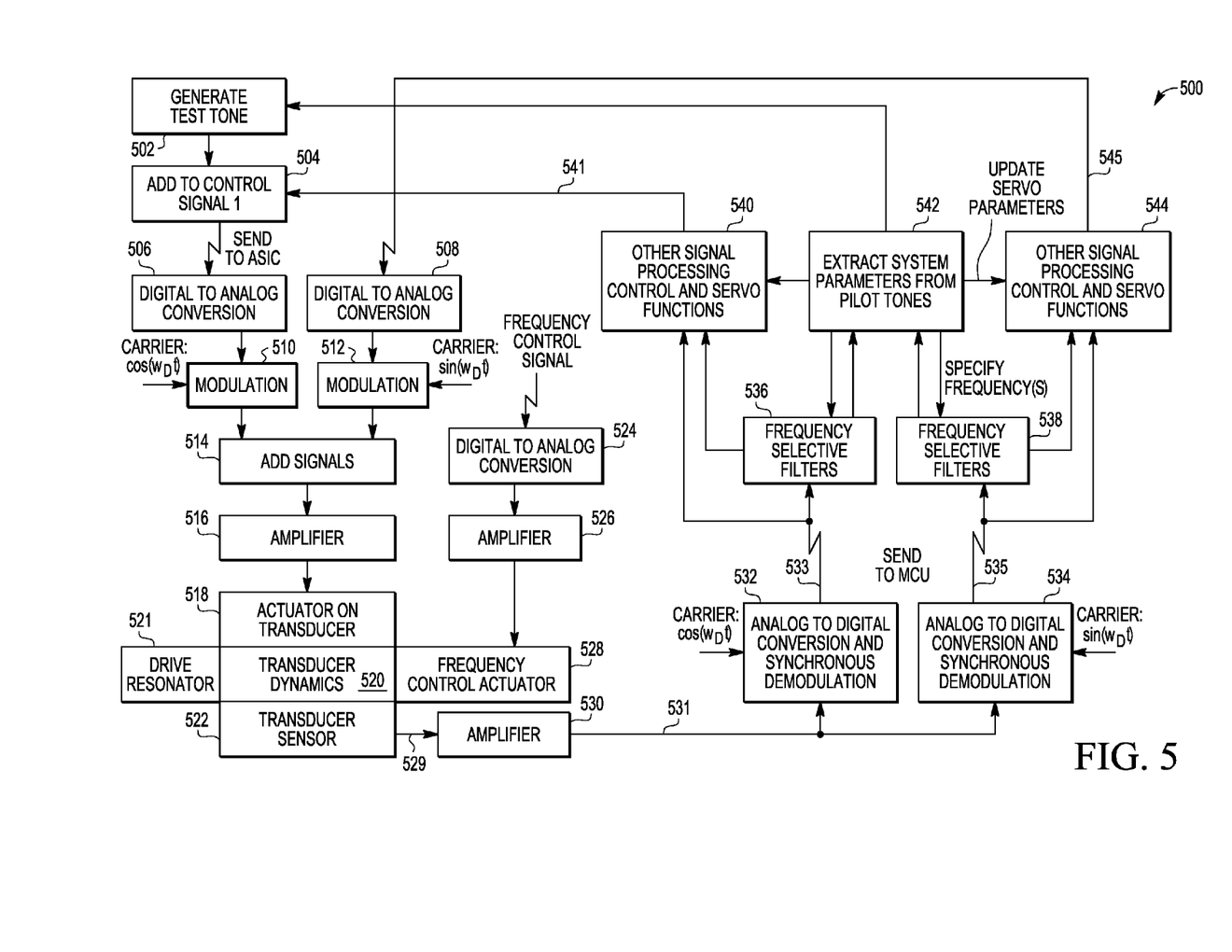
FIG. 5 depicts a signal processing flow chart for the operation of a MEMS inertial sensor in accordance with selected embodiments of the present disclosure.

FIG. 5 depicts a signal processing flow chart 500 for the operation of a MEMS inertial sensor in accordance with selected embodiments of the present disclosure wherein variable frequency pilot tone signals are injected into the inertial sensor and then extracted in order to calculate key system parameters without the need for computationally expensive estimators. The process begins at step 502 where the pilot test tone is first generated. At this point, it is generally assumed that the quadrature error has been reduced from the sense mass resonator output by feeding back a quadrature error correction signal, thereby freeing the quadrature feedback channel for use in passing one or more pilot test tones. The input pilot test tone generated at step 502 has a known amplitude and frequency. While the input pilot test tone may be selected to be "in-band" relative to the input data signal since the pilot test tone is in quadrature, the use of an out-of-band frequency for the pilot test tone increases reliability and performance for a variety of reasons, including the leakage between the quadrature channels. In various embodiments, the pilot test tones are generated by the MCU in digital format to simplify the injection of these signals into the quadrature control feedback signal 541 (Control Signal 1).

At step 504, the pilot test tone is added to the quadrature control feedback signal 541 (Control Signal 1) and then sent to the ASIC section where it is converted into analog format (step 506) and then modulated with the quadrature carrier signal $\cos(\omega_D t)$ (step 510). Depending on the sensor parameter being tested, the pilot test tone amplitude may be appropriately scaled prior to being combined with the quadrature control feedback signal 541. At the same time, rate feedback information 545 (e.g., signal processing, control and/or servo functions) is also converted into analog format (step 508) and then modulated with the rate carrier signal $\sin(\omega_D t)$ (step 512). At step 514, the modulated pilot tone signal is added to the modulated additional rate feedback signal, and the summed signal (including the pilot tone signal information) is then amplified (step 516) and applied to an actuator(s) on the transducer (step 518). As an example, the summed signal (including the pilot tone signal information) may be applied to force feedback electrode structures which control the oscillation and movement of the sense mass in the transducer. At the same time, the frequency control signal for the sense mass resonator is converted into analog format at the ASCI (step 524) and amplified (step 526) before being applied as a drive signal to the sense mass frequency control actuator (step 528). The actuators interact with the transducer dynamics (step 520) and transducer sensor (step 522) to generate a sense mass resonator output signal 529. In addition, the drive resonator provides the modulating driving signal for these mechanical operations (step 521).

At step 530, the sense mass resonator output signal 529 is amplified for subsequent synchronous demodulation. In particular, the amplified sense resonator output signal 531 is demodulated into a quadrature/test channel 533 by applying the quadrature carrier signal $\cos(\omega_D t)$ and converting the demodulated quadrature/test signal into digital format (step 532). Simultaneously, the amplified sense mass resonator output signal 531 is demodulated into a rate channel 535 by applying the rate carrier signal $\sin(\omega_D t)$ and converting the demodulated rate signal into digital format (step 534). The digital format signals 533, 535 correspond to the baseband output signals Q and I, respectively, and are sent to the MCU section for digital processing.

In the MCU, the digital format signals 533, 535 may also be separately processed at steps 540, 544, respectively, to apply additional signal processing and/or control/servo functions for the quadrature and rate feedback. In particular, the processing at step 540 generates a quadrature control feedback signal 541, and the processing at step 544 generates additional rate feedback information 545. The MCU also applies Goertzel (or similar frequency selective) algorithms to the digital format signals 533, 535 at steps 536, 538, respectively. The Goertzel algorithms or other frequency selective filters are used extract or block the pilot tone content from the digital format signals 533, 535 at a specified frequency (e.g., the known pilot tone frequency). Signals derived from 533 and 535 that are passed to block 542 will have the pilot tones enhanced by these frequency selective filters. Signals derived from 533 and 535 that are passed to blocks 540 and 544 will have these pilot tone substantially blocked or eliminated. The frequency(s) that are blocked or passed can be controlled by block 542 by a frequency selection signal. To enable different pilot test tones to be extracted or blocked, there may be multiple Goertzel or other frequency selective filtering algorithms running in parallel that are time shifted from each other to increase the effective bandwidth of the output data.

Based on the extracted frequency content, one or more key system parameters (such as the plant Q, plant gain, gain offsets, bias terms, coupling coefficients, delays, correlations, etc.) may be computed (step 542). For example, the Q of the sense resonator can be estimated by determining the ratio of the extracted test tone amplitude to the generated test tone amplitude. Generally speaking, step 542 measures the amplitude and, or phase relationships of one or more pilot tones, and uses these measures to extract various bias, offset and coupling terms. In selected embodiments, time or frequency multiplexing may be used to measure the ratio of test tone amplitudes at selected frequencies to determine various parameters of the system. If time multiplexing is used, the pilot test tone frequencies may be updated at specific times and the Goertzel algorithms may be changed correspondingly to extract these frequencies. Based on these updates, estimates to various signal processing and servo systems parameters may be determined.

By appropriate selection of the pilot tone(s), the physical dynamics of the inertial sensor are used to modify the pilot tone signals in ways that are highly correlated to the parameters being measured. This is much more transparent to the designer and developer, is easier to implement, and reduces by several orders of magnitude the computational requirements to measure parameter variations and adapt to these changes.

By now, it should be appreciated that there has been provided herein a MEMS sensor and associated method of operation. The disclosed MEMS sensor includes a gyro transducer that is configured to sense an angular rate of the sensor about a rotational axis. The gyro sensor includes a drive mass that is configured to undergo oscillatory linear motion within a plane; a sense mass that is configured to undergo an oscillatory motion out of the plane as a function of the angular rate about the rotational axis within the plane; one or more electrodes are used to sense this motion corresponding to the input angular rate; one or more electrodes that are positioned in relation to the sense mass for receiving a rate feedback signal which electrostatically controls the motion of the sense mass; and one or more electrodes that are positioned in relation to the sense mass for receiving a quadrature feedback signal which includes a pilot test tone signal and which electrostatically controls the motion of the sense mass. In addition, the MEMS sensor includes an ASIC that is coupled between the gyro transducer and the processor or microcontroller and that serves as an analog/digital interface between the gyro transducer and the microcontroller. In selected embodiments, the ASIC includes synchronous demodulator circuitry for generating a demodulated cosine channel which conveys the recovered pilot tone signal, and for generating a demodulated sine channel which conveys an angular rate signal which represents the angular rate about the rotational axis. The MEMS sensor also includes a microcontroller that uses software and/or hardware to generate one or more pilot tone signals that are included in the quadrature feedback signal. To this end, the microcontroller includes a digital pilot tone generation module which generates the one or more pilot tone signals which are directly or indirectly injected into the gyro transducer through the one or more electrodes during normal sensing operation of the gyro transducer. The digital pilot tone generation module may be configured to generate an amplitude and frequency selectable low frequency pilot tone signal for injection into the gyro transducer. The microcontroller also includes a test signal recovery module for recovering a pilot tone signal from the gyro transducer. As described, the test signal recovery module applies a Goertzel algorithm or other frequency selective algorithm on a pair of baseband output signals received from the gyro transducer to extract content from the pair of baseband output signals at one or more predetermined frequencies corresponding to the one or more pilot tone signals which are injected into the gyro transducer. Finally, the microcontroller includes a gyro parameter extraction module for computing one or more performance parameters of the gyro transducer based on the recovered pilot tone signal without requiring down time or interference with normal sensing operation of the gyro transducer. In selected embodiments, the gyro parameter extraction module uses the recovered pilot tone signal to compute sense resonator Q, plant gain, gain offset, bias term, frequency offsets between the drive and sense resonators, coupling coefficient, delay, or correlation values for the gyro transducer while continuously monitoring the angular rate of the gyro transducer about the rotational axis. For example, the gyro parameter extraction module can computes a predetermined performance parameter by measuring a ratio of a first pilot tone signal that is injected into the gyro transducer to the recovered pilot tone signal corresponding to the first pilot tone signal. To free up the demodulated cosine channel, the microcontroller may include a quadrature error correction module which implements a quadrature control law and generates a quadrature error correction signal that is included in the quadrature feedback signal to the gyro transducer. The gyro transducer and microcontroller may be assembled together in a common package, alone or in combination with the ASIC.

In another form, there is provided an inertial sensor that includes a transducer unit for sensing angular velocity, a synchronous demodulator for generating baseband output signals in response to the sensed angular velocity, and a transducer feedback control system for generating feedback to the transducer unit. The transducer unit includes a sense resonator (e.g., a MEMS gyro sensor having a sense resonator and a drive resonator) that generates an output signal that is responsive to motion of the transducer unit experiencing angular velocity about a rotational axis, and also includes a feedback input for receiving a feedback control signal. The synchronous demodulator is coupled to receive the transducer unit's output signal for generating baseband output signals, including a first baseband output signal (e.g., an I signal) for conveying angular velocity data, and a second baseband output signal (e.g., a Q signal) for conveying oscillation data for the sense resonator which includes a pilot tone signal. In selected embodiments, the synchronous demodulator includes first and second analog-to-digital converters for sampling the output signal from the transducer unit at a first and second oscillating drive signals $\sin(\omega_D t)$, $\cos(\omega_D t)$ to generate a first baseband output signal (for conveying angular velocity data) and a second baseband output signal (for conveying oscillation data for the sense resonator which includes a pilot tone signal). The transducer feedback control system receives the first and second baseband output signals at a pair of inputs, and generates a feedback control signal at a feedback output that is coupled to the transducer unit. In particular, the transducer feedback control system includes a pilot test tone signal generator for generating a predetermined pilot tone signal that is applied to the feedback output on a quadrature channel for injection into the sense resonator. The pilot test tone signal generator generates one or more pilot test tone signals $PT(nT)=M(nT) \sin(\omega_p nT))$, each having a known amplitude (M), frequency ($\omega_P$) and time value nT, where n is an integer and T is time value. The transducer feedback control system also includes an extraction means for performing frequency selective filtering on the first and second baseband output signals to extract or block predetermined frequency content corresponding to the predetermined pilot tone signal from the quadrature channel, thereby generating an extracted pilot tone signal. In an example embodiment, the extraction means are implemented with first and second Goertzel means for performing the Goertzel algorithm or another frequency selective algorithm on the I and Q baseband signals, respectively. Finally, the transducer feedback control system includes a means for processing the extracted pilot tone signal to determine one or more predetermined sensor performance parameters for the transducer unit. For example, the extracted pilot tone signals can be processed by a gyro parameter extraction module which extracts one or more gyro performance parameters, such as by measuring amplitude variations in the extracted pilot tone signal and calibrating measured amplitude variations to a Q for the sense resonator.

In yet another form, there is provided a method of operating an inertial sensor having a transducer with a sense resonator. In the disclosed method, a pilot tone signal is injected to cause an oscillation of the sense resonator in a quadrature channel. The pilot tone signal generation may generate one or more pilot tone signals $PT(nT)=M(nT) \sin(\omega PnT))$, each having a known amplitude (M), frequency ($\omega P$) and time value nT, where n is an integer and T is time value. In response to the pilot tone signal, first and second signals are provided by the sense resonator that respond to the oscillation of the sense resonator in the quadrature channel and the non-quadrature channel, respectively. In response to the first and second signals from the sense resonator, first and second baseband signals are provided and processed by performing frequency selective filtering on the first and second baseband signals (e.g., performing a Goertzel algorithm on the first and second baseband signals) to extract or block predetermined frequency content corresponding to the pilot tone signal, thereby generating an extracted pilot tone signal. The extracted pilot tone signal is then processed to extract one or more inertial sensor performance parameters, such as by measuring amplitude variations in the extracted pilot tone signal and calibrating measured amplitude variations to a Q for the sense resonator. These extracted parameters are then used to update one or more control laws or adjust one or more frequency offsets for the inertial sensor.

Although the described exemplary embodiments disclosed herein are directed to various MEMS sensor structures and methods for making same, the present invention is not necessarily limited to the example embodiments which illustrate inventive aspects of the present invention that are applicable to a wide variety of MEMS sensor devices, manufacturing methods and operational methodologies. While the disclosed MEMS devices may be implemented as a gyroscope, the fabrication process described herein is not limited to gyroscopes or any other type of sensor, but is also applicable to any one of numerous MEMS devices that include some type of structure that is movably suspended by one or more springs and that is formed by bonding an active wafer to a reference wafer. Non-limiting examples of such devices include various types of accelerometers and switches, optical MEMS system components, and other MEMS system devices that use drive and sense electrodes. Thus, the particular embodiments disclosed above are illustrative only and should not be taken as limitations upon the present invention, as the invention may be modified and practiced in different but equivalent manners apparent to those skilled in the art having the benefit of the teachings herein. For example, the methodology of the present invention may be applied using drive mass and sense mass structures other than expressly set forth herein. And while selected aspects of the present invention have been described with reference to implementation in whole or in part with a processor or microcontroller unit, it will be appreciated that other implementations may be used, including but not limited to using dedicated logic and/or analog elements and various combinations of an MCU, dedicated logic and analog. In addition, the process steps may be performed in an alternative order than what is presented. And event though Goertzel algorithms may be usefully applied, there may be situations in which it may be beneficial to use an alternative, such as a bandpass filter. There may also be a variety of different actuation methods and techniques used for feeding back the quadrature/test signal to the transducer. For example, the force feedback electrodes may be located in any desired configuration with respect to the sense mass or drive mass structures, provided that the feedback signaling takes the location configuration into account. Accordingly, the foregoing description is not intended to limit the invention to the particular form set forth, but on the contrary, is intended to cover such alternatives, modifications and equivalents as may be included within the spirit and scope of the invention as defined by the appended claims so that those skilled in the art should understand that they can make various changes, substitutions and alterations without departing from the spirit and scope of the invention in its broadest form.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. The term "coupled," as used herein, is not intended to be limited to a direct coupling or a mechanical coupling. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A MEMS sensor, comprising:
    a gyro transducer configured to sense an angular rate about a rotational axis, comprising:
        a drive mass configured to undergo oscillatory linear motion within a plane;
        a sense mass configured to undergo an oscillatory motion out of the plane as a function of the angular rate about the rotational axis within the plane;
        one or more electrodes positioned in relation to the sense mass for receiving a rate feedback signal and a quadrature feedback signal which includes a pilot test tone signal, and for electrostatically controlling motion of the sense mass; and
    a processor for generating one or more pilot tone signals that are included in the feedback signal, comprising:
        a digital pilot tone generation module for generating the one or more pilot tone signals which are injected into the gyro transducer through the one or more electrodes during normal sensing operation of the gyro transducer;
        a test signal recovery module for recovering a pilot tone signal from the gyro transducer; and
        a gyro parameter extraction module for computing one or more performance parameters of the gyro transducer based on the recovered pilot tone signal without requiring down time or interference with normal sensing operation of the gyro transducer.

2. The MEMS sensor of claim 1, further comprising an integrated circuit coupled between the gyro transducer and the processor which serves as an analog/digital interface between the gyro transducer and the processor.

3. The MEMS sensor of claim 2, where the integrated circuit comprises a synchronous demodulator for generating a demodulated cosine channel which conveys the recovered pilot tone signal, and for generating a demodulated sine channel which conveys an angular rate signal which represents the angular rate about the rotational axis.

4. The MEMS sensor of claim 1, where the gyro transducer and processor are assembled together in a common package.

5. The MEMS sensor of claim 1, where the processor feeds back a quadrature error correction signal to the gyro transducer to correct for quadrature errors by reducing an amplitude of potential interfering signals in the quadrature feedback signal.

6. The MEMS sensor of claim 1, where the gyro parameter extraction module uses the recovered pilot tone signal to estimate sense resonator Q, plant gain, gain offset, one or more bias terms, frequency offsets between the drive mass and sense mass, coupling coefficients, delay, or correlation values for the gyro transducer while continuously monitoring the angular rate of the gyro transducer about the rotational axis.

7. The MEMS sensor of claim 1, where the test signal recovery module applies a Goertzel algorithm or another frequency selective filtering method on a pair of baseband output signals received from the gyro transducer to extract or block content from the pair of baseband output signals at one or more predetermined frequencies corresponding to the one or more pilot tone signals which are injected into the gyro transducer.

8. The MEMS sensor of claim 1, where the gyro parameter extraction module computes a predetermined performance parameter by measuring a ratio of a first pilot tone signal that is injected into the gyro transducer to the recovered pilot tone signal corresponding to the first pilot tone signal.

9. The MEMS sensor of claim 1, where the digital pilot tone generation module is configured to generate an amplitude and frequency selectable low frequency pilot tone signal for injection into the gyro transducer.

10. An inertial sensor, comprising:
    a transducer unit comprising a feedback input for receiving a feedback control signal, the transducer unit comprising a sense resonator for generating an output signal that is responsive to motion of the transducer unit experiencing an angular velocity;
    a synchronous demodulator coupled to receive the output signal from the transducer unit for generating baseband output signals comprising a first baseband output signal for conveying angular velocity data, and a second baseband output signal for conveying oscillation data for the sense resonator which includes a pilot tone signal; and
    a transducer feedback control system having a pair of inputs for receiving the first and second baseband output signals, and a feedback output coupled to the feedback input of the transducer unit, the transducer feedback control system comprising:
        a pilot test tone signal generator for generating a predetermined pilot tone signal that is applied to the feedback output for injection into the sense resonator;
        a filter module for performing frequency selective filtering on the first and second baseband output signals to extract or block predetermined frequency content corresponding to the predetermined pilot tone signal from the quadrature channel, thereby generating an extracted pilot tone signal; and
        an extraction module for processing the extracted pilot tone signal to determine one or more predetermined sensor performance parameters for the transducer unit.

11. The inertial sensor of claim 10, where the transducer unit comprises a MEMS gyro sensor for sensing an angular velocity about a rotational axis.

12. The inertial sensor of claim 11, where the MEMS gyro sensor comprises a sense resonator and a drive resonator.

13. The inertial sensor of claim 10, where the synchronous demodulator comprises:
    a first analog-to-digital converter for sampling the output signal from the transducer unit at a first oscillating drive signal $\sin(\omega_D t)$ to generate the first baseband output signal for conveying angular velocity data, and
    a second analog-to-digital converter for sampling the output signal from the transducer unit at a second oscillating drive signal $\cos(\omega_D t)$ to generate the second baseband output signal for conveying oscillation data for the sense resonator which includes a pilot tone signal.

14. The inertial sensor of claim 10, wherein the first and second baseband output signal are an I signal and a Q signal.

15. The inertial sensor of claim 14, wherein the filter module comprises:
    first Goertzel filter for performing the Goertzel algorithm on the I signal; and
    second Goertzel filter for performing the Goertzel algorithm on the Q signal.

16. A method of operating an inertial sensor having a transducer with a sense resonator, comprising:

causing an oscillation of the sense resonator in a quadrature channel by injecting a pilot tone signal;

providing a first signal from the sense resonator that is responsive to the oscillation of the sense resonator in the quadrature channel;

providing a second signal from the sense resonator that is responsive to an angular rate experienced by the sense resonator in a non-quadrature channel;

providing a first baseband signal and a second baseband signal responsive to the first and second signals from the sense resonator;

extracting or blocking predetermined frequency content from the first baseband signal and the second baseband signal corresponding to the pilot tone signal, thereby generating an extracted pilot tone signal; and processing the extracted pilot tone signal to extract one or more inertial sensor performance parameters.

17. The method of claim 16, further comprising using the inertial sensor performance parameters to update one or more control laws or adjust one or more frequency offsets for the inertial sensor.

18. The method of claim 16, where extracting or blocking predetermined frequency content comprises performing a Goertzel algorithm on the first baseband signal and the second baseband signal to extract or block predetermined frequency content corresponding to the pilot tone signal.

19. The method of claim 16, where causing the oscillation of the sense resonator in the quadrature channel comprises generating one or more pilot tone signals $PT(nT) = M(nT) \sin(\omega_p nT)$, each having a known amplitude (M), frequency ($\omega_p$) and time value nT, where n is an integer and T is time value.

20. The method of claim 16, where processing the extracted pilot tone signal comprises measuring amplitude variations in the extracted pilot tone signal and calibrating measured amplitude variations to a Q for the sense resonator.

* * * * *